(12) United States Patent
Matsuda et al.

(10) Patent No.: US 7,859,982 B2
(45) Date of Patent: Dec. 28, 2010

(54) OPTICAL INFORMATION RECORDING MEDIUM AND MOLD APPARATUS FOR MANUFACTURING THE SAME

(75) Inventors: Isao Matsuda, Gunma (JP); Toru Fujii, Gunma (JP); Yoshikazu Takagishi, Gunma (JP); Fumi Hara, Gunma (JP)

(73) Assignee: Taiyo Yuden, Co., Ltd., Tokyo (JP)

( * ) Notice: Subject to any disclaimer, the term of this patent is extended or adjusted under 35 U.S.C. 154(b) by 783 days.

(21) Appl. No.: 11/740,179

(22) Filed: Apr. 25, 2007

(65) Prior Publication Data

US 2007/0258348 A1 Nov. 8, 2007

(30) Foreign Application Priority Data

Apr. 28, 2006 (JP) ............... 2006-150626

(51) Int. Cl.
G11B 7/24 (2006.01)
(52) U.S. Cl. .................................................. 369/275.4
(58) Field of Classification Search .............. 369/275.4, 369/275.3
See application file for complete search history.

(56) References Cited

U.S. PATENT DOCUMENTS

| 4,947,384 | A | * | 8/1990 | Suzuki et al. | ............ 369/275.1 |
|---|---|---|---|---|---|
| 5,144,552 | A | * | 9/1992 | Abe | ........................ 369/275.4 |
| 5,553,051 | A | * | 9/1996 | Sugiyama et al. | ......... 369/275.4 |
| 5,926,446 | A | | 7/1999 | Shimizu et al. | |
| 6,906,993 | B2 | | 6/2005 | Wang et al. | |
| 7,102,986 | B2 | | 9/2006 | Moribe et al. | |
| 7,236,449 | B2 | * | 6/2007 | Endoh | ..................... 369/275.4 |
| 2002/0027869 | A1 | * | 3/2002 | Morita et al. | ............ 369/275.4 |

FOREIGN PATENT DOCUMENTS

| EP | 0762392 B1 | 11/2001 |
|---|---|---|
| EP | 1296318 A1 | 3/2003 |
| EP | 1302937 A2 | 4/2003 |
| EP | 1276101 B1 | 10/2004 |
| EP | 1262964 B | 9/2009 |
| JP | 09-180262 | 7/1997 |
| JP | 2001-273682 | 10/2001 |
| JP | 2005-302272 | 10/2005 |
| WO | WO01/65552 A | 9/2001 |

* cited by examiner

Primary Examiner—Thang V Tran
(74) Attorney, Agent, or Firm—Law Office of Katsuhiro Arai

(57) ABSTRACT

An optical information recording medium comprises at least a substrate on which a groove is formed in a recording area, a recording layer comprising an organic dye, and a reflective layer. The recording area has a preformat area and a data area, and the groove in the preformat area is narrower or shallower than that in the data area.

5 Claims, 3 Drawing Sheets

[FIG. 1]
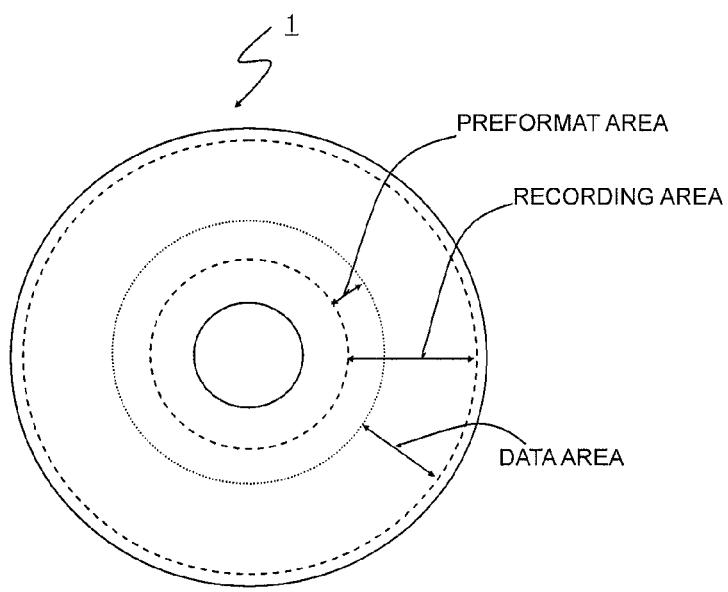
[FIG. 2]
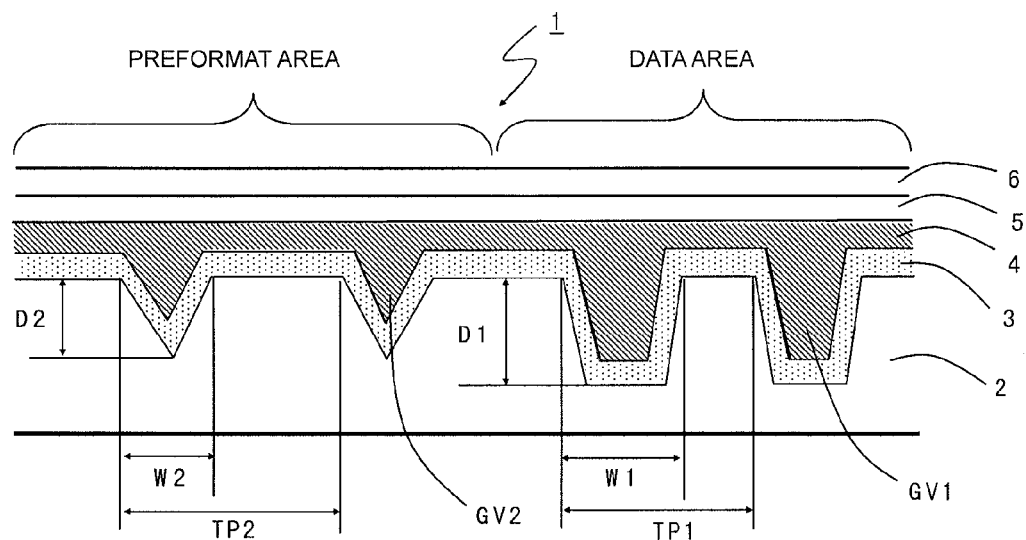

[FIG. 3]
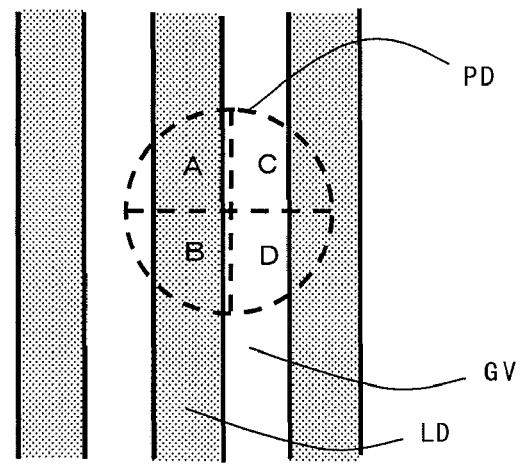
[FIG. 4]
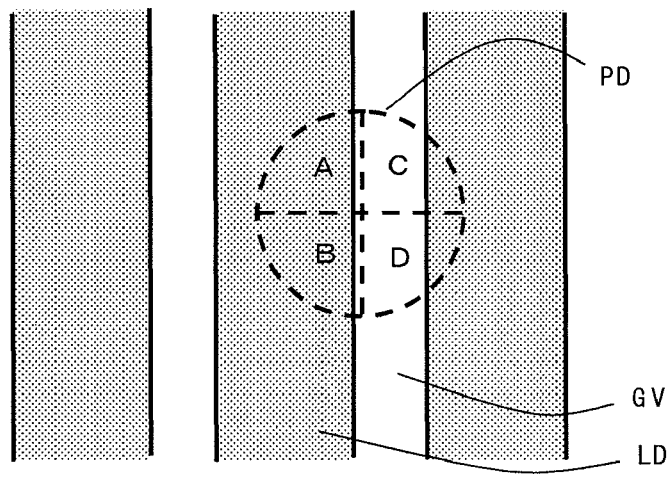
[FIG. 5]
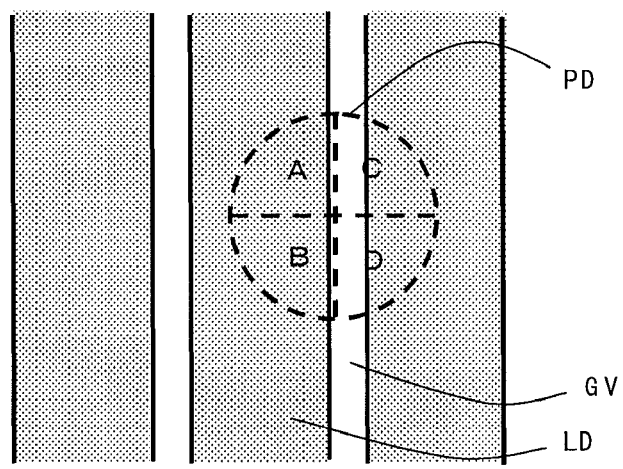

[FIG. 6]
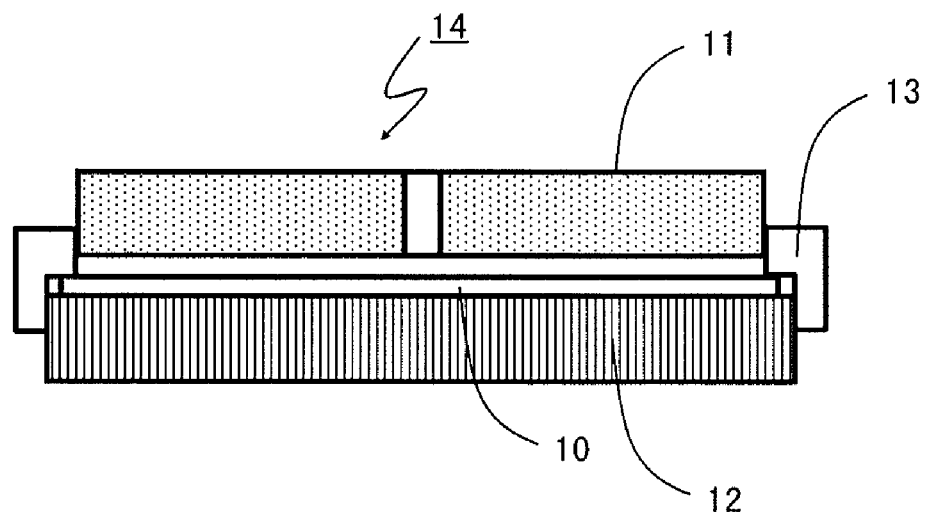
[FIG. 7]
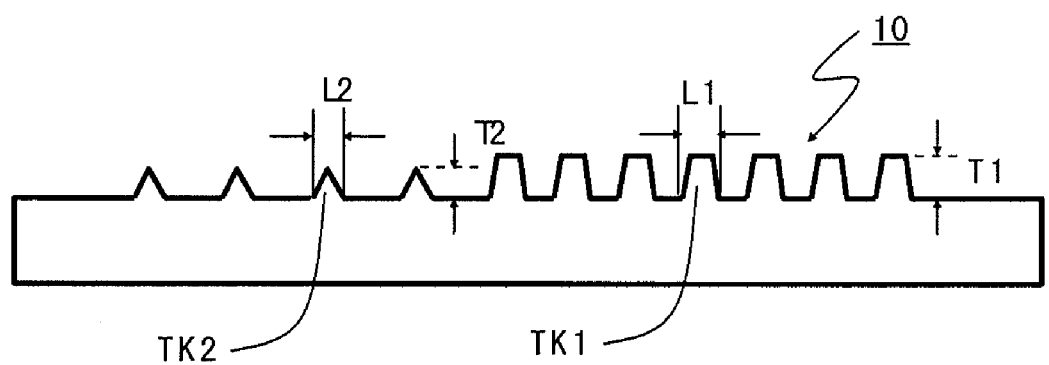

OPTICAL INFORMATION RECORDING MEDIUM AND MOLD APPARATUS FOR MANUFACTURING THE SAME

BACKGROUND OF THE INVENTION

1. Field of the Invention

One inventive aspect relates to a write-once optical information recording medium and an apparatus used for manufacturing the same. Specifically, the inventive aspect relates to an optical information recording medium suitable for recording with laser light at a wavelength of approximately 360 to 450 nm (so-called blue laser light) using a semiconductor laser and to a mold apparatus used for manufacturing the same.

2. Description of the Related Technology

Write-once optical information recording media using blue laser light at a shorter wavelength of about 360 to 450 nm, e.g., blue laser light at 405 nm, are currently being developed. The optical information recording media each include a recording layer using an organic dye compound so that the organic dye compound is decomposed or deteriorated by absorption of laser light to obtain, as a degree of modulation, a change in optical properties of the laser light at a recording/reproduction wavelength, for performing recording and reproduction.

For example, as disclosed in Japanese Unexamined Patent Application Publication No. 2005-302272, the optical information recording media each include a reflective layer, a recording layer, and a protective layer which are formed on a substrate, a spiral groove referred to as a "groove" being formed in a portion (recording area) of the substrate in which the recording layer is to be formed. In recording data on such optical information recording media, pits are formed in the grooves. The recording area is divided into a preformat area in which recording condition data such as media ID and laser power is previously stored, and a data area in which information is recorded by a user. The two areas have different groove spacings (track pitch), and the track pitch in the preformat area is wider than that in the data area.

Among these optical information recording media, a Low-to-High system optical information recording medium has the tendency that a push-pull (NPPb) signal is increased. In particular, in the preformat area having a wider track pitch, the NPPb signal is further increased, thereby causing the problem of failing to effect tracking.

SUMMARY OF CERTAIN INVENTIVE ASPECTS

Accordingly, it is an object of one inventive aspect to provide an optical information recording medium capable of suppressing an increase in NPPb signal in a preformat area to obtain a satisfactory push-pull signal in recording.

In accordance with an embodiment of the present invention, an optical information recording medium includes at least a substrate on which a groove is formed in a recording area, a recording layer containing an organic dye, and a reflective layer. The recording area has a preformat area and a data area, the groove in the preformat area being narrower or shallower than that in the data area.

The groove in the preformat area preferably has a V-shaped cross-section taken along the diameter direction of the recording medium.

According to one inventive aspect, the groove in the preformat area is narrowed to decrease a signal difference detected by a photodetector, thereby suppressing an increase in NPPb signal.

One inventive aspect also provides a mold apparatus used for molding a substrate on which a groove is formed in a recording area in manufacturing an optical information recording medium, the mold apparatus including an upper mold, a lower mold, and a stamper. The stamper has a projection for forming the groove at a position corresponding to the recording area, the projection at a position corresponding to the preformat area being narrower or lower than that at a position corresponding to the data area.

According to one inventive aspect, it is possible to easily form the substrate in which the groove in the preformat area is narrower or shallower than that in the data area, thereby permitting the manufacture of an optical information recording medium in which a NPPb signal in the preformat area is small.

According to one inventive aspect, it is possible to obtain a satisfactory push-pull signal and satisfactorily perform recording. Therefore, an optical information recording medium capable of higher-density and higher-speed recording can be obtained.

BRIEF DESCRIPTION OF THE DRAWINGS

FIG. 1 is a schematic plan view showing a recording area, a preformat area, and a data area of an optical information recording medium;

FIG. 2 is a schematic view showing a portion of a section of an optical formation recording medium taken along the diameter direction according to an embodiment of the present invention;

FIG. 3 is a schematic view showing a state in which a groove in a data area is scanned with laser light.

FIG. 4 is a schematic view showing a scanning state in a preformat area of a conventional optical information recording medium;

FIG. 5 is a schematic view showing a scanning state in a preformat area of an optical information recording medium according to an embodiment of the present invention;

FIG. 6 is a schematic view showing a mold apparatus used for manufacturing an optical information recording medium according to an embodiment of the present invention; and FIG. 7 is a schematic view showing a portion of a section of a stamper used for manufacturing an optical information recording medium according to an embodiment of the present invention.

DESCRIPTION OF CERTAIN INVENTIVE EMBODIMENTS

An optical information recording medium according to an embodiment of the present invention will be described on the basis of the drawings. FIG. 1 is a schematic plan view showing a recording area, a preformat area, and a data area of an optical information recording medium. FIG. 2 is a schematic view showing a portion of a section of an optical information recording medium taken along the diameter direction according to an embodiment of the present invention. As shown in FIG. 2, an optical information recording medium 1 includes a reflective layer 3 composed of a metal layer with high reflectance, such as aluminum; a recording layer 4 containing an dye such as azo or cyanine; a transparent intermediate layer 5 composed of a metal such as aluminum nitride; and a light transmitting layer 6 composed of a polycarbonate sheet, which are formed on a substrate of polycarbonate in that order with an adhesive provided between the intermediate layer 5 and the light transmitting layer 6. In one embodiment, the optical information recording medium also includes a substrate 2.

As shown in FIG. 1, in the optical information recording medium 1, the recording area is divided into the data area and the preformat area. As shown in FIG. 2, the width W2 of groove GV2 in the preformat area is smaller than the width W1 of groove GV1 in the data area. Also, the track pitch TP2 in the preformat area is wider than the track pick TP1 in the data area. Furthermore, the depth D2 of the groove GV2 is smaller than the depth D1 of the groove GV1.

The reason why a NPPb signal in the preformat area of the optical information recording medium 1 is decreased is described with respect to the groove width with reference to FIGS. 3 to 5. FIG. 3 is a schematic view showing a state in which the groove in the data area is scanned with laser light. FIG. 4 is a schematic view showing a scanning state in a preformat area of a conventional optical information recording medium. FIG. 5 is a schematic view showing a scanning state in the preformat area of the optical information recording medium according to one embodiment. The NPPb signal is represented by, for example, a signal difference when the groove is scanned with laser light in the four divided areas A, B, C, and D of a photodetector PD, and is defined as NPPb= ((A+B)−(C+D))/((A+B)+(C+D)).

FIG. 3 shows a state in which the groove GV is scanned with a beam spot applied from a pick-up and return light is received by the photodetector PD. The ratio of a portion overlapping the groove GV in the areas C and D is higher than that in the areas A and B. Since the land LD and the groove GV have a difference in brightness, a signal difference occurs according to the ratio of a portion overlapping the groove GV, thereby producing a NPPb signal.

As shown in FIG. 4, in the preformat area, the width of the groove GV is the same as that in the data area, but the width of the land LD is larger than that in the data area, i.e., the track pitch is increased. In this case, a portion overlapping the groove GV in the areas A and B of the photodetector PD is decreased to increase a signal difference between the areas A and B and the areas C and D. Consequently, the NPPb signal is increased.

Therefore, as shown in FIG. 5, the width of the groove GV in the preformat area is decreased so that a portion of the groove GV overlapping the photodetector PD is decreased. Accordingly, a signal difference between the areas A and B and the areas C and D is decreased to decrease the NPPb signal.

Next, a decrease in the NPPb signal will be described with respect to the groove depth. When the depth of the groove GV is decreased, the depth approaches the height of the land LD. Therefore, a difference in brightness between the groove GV and the land LD is decreased, and a signal difference detected by the photodetector PD is decreased. Accordingly, a signal difference between the areas A and B and the areas C and D is decreased to decrease the NPPb signal.

Since information has been previously input in the preformat area by wobbling the groove, pits need not be formed by laser irradiation, and thus the width or depth of the groove can be decreased within a detectable range. In addition, in this embodiment, both the width and the depth of the groove in the preformat area are smaller than those in the data area. However, even when at least one of the width and the depth of the groove in the preformat area is smaller than that in the data area, benefits are exhibited.

The optical information recording medium 1 of one embodiment is manufactured as follows: First, a polycarbonate resin is molded into a disk shape by injection molding using a mold apparatus 14 as shown in FIG. 6. The mold apparatus 14 is provided with an upper mold 11, a lower mold 12, and a stamper 10 formed in the space formed between the upper and lower molds 11 and 12, a groove pattern being formed on the stamper 10. The mold apparatus 14 is further provided with a stamper presser 13 for fixing the stamper 10.

FIG. 7 shows a portion of a section of the stamper 10. In the stamper 10, a projection TK2 for forming the groove, which has an inverted V-shaped cross-section, is formed in a portion corresponding to the preformat area. Also, a projection TK1, which has a trapezoidal cross-section, is formed in a portion corresponding to the date area. The width L2 of the projection TK2 is smaller than the width L1 of the projection TK1. In addition, the height T2 of the projection TK2 is smaller than the height T1 of the projection TK1.

By using the stamper 10, the substrate 2 used for the optical information recording medium of one embodiment can be formed.

Next, a metal layer is formed on the substrate 2 by sputtering to form the reflective layer 3. Next, a dye solution is applied on the reflective layer 3 by spin coating and then dried to form the recording layer 4. Then, the intermediate layer 5 is formed on the recording layer 4 by sputtering according to demand, and the light transmitting layer 6 composed of polycarbonate is bonded to the intermediate layer 5 through an adhesive. As a result, the optical information recording medium 1 is formed.

Verification of the advantage of certain embodiments will be described. As an example, a polycarbonate substrate having a portion corresponding to a preformat area with a track pitch of 0.35 μm and a groove width of 0.12 μm and a portion corresponding to a data area with a track pitch of 0.32 μm and a groove width of 0.18 μm was formed by injection molding to prepare a disk-shaped substrate having an outer diameter of 120 mm and a thickness of 1.1 mm. On the other hand, as a comparative example, a substrate having a portion corresponding to a preformat area with a track pitch of 0.35 μm and a groove width of 0.18 μm and a portion corresponding to a data area with a track pitch of 0.32 μm and a groove width of 0.18 μm was formed by the same method as the above.

Then, a reflective layer composed of silver was formed to a thickness of 60 nm on each of the substrates by sputtering. Next, a dye solution prepared by dissolving an azo dye represented by formula 1 below in a TFP (tetrafluoropropanol) solvent was applied by spin coating and then dried at a temperature of 80° C. for 30 minutes to form a recording layer.

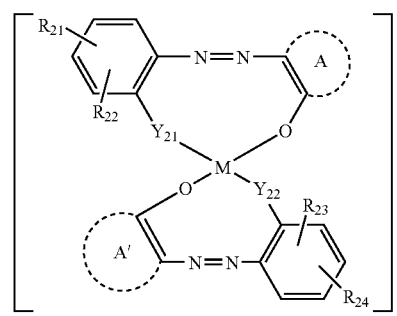

Formula 1 wherein A and A' represent the same or different heterocyclic rings each containing at least one heteroatom selected from a nitrogen atom, an oxygen atom, a sulfur atom, a selenium atom, and a tellurium atom, $R_{21}$ and $R_{24}$ each independently represent a hydrogen atom or a substituent, and Y21 and Y22 represent the same or different heteroatoms selected from the Group XVI elements in the periodic table.

Then, a transparent material composed of aluminum nitride was formed to a thickness of 20 nm on the recording layer by sputtering to form an intermediate layer. Next, a polycarbonate sheet of 0.1 mm in thickness was bonded to the intermediate layer using an acrylic transparent adhesive to prepare an optical information recording medium.

The resultant optical information recording media were evaluated with respect to recording/reproduction characteristics (NPPb, Jitter) at a wavelength of 405 nm, a numerical aperture NA of 0.85, and a linear speed of 4.92 m/s using a commercial recording/reproduction apparatus (DDU-1000 manufactured by Pulstec Industrial Co., Ltd.). The results are shown in Table 1.

TABLE 1

|  | NPPb | | Jitter(%) |
| --- | --- | --- | --- |
|  | Preformat area | Data area | |
| Example of one embodiment | 0.40 | 0.55 | 6.0 |
| Comparative Example | 0.85 | 0.55 | 6.0 |

The results indicate that the example of one embodiment has the effect of decreasing NPPb in the preformat area. Therefore, an optical information recording medium capable of higher-density and higher-speed recording can be realized.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording medium comprising:
   a substrate on which a groove is spirally formed in a recording area, wherein the recording area has a radially-defined preformat area and a radially-defined data area, wherein the data area has multiple grooves aligned in a radial direction at a first pitch, and the preformat area has multiple grooves aligned in a radial direction at a second pitch which is greater than the first pitch, wherein the spiral groove in at least a portion of the preformat area is narrower and/or shallower than that in the data area.

2. The optical information recording medium of claim 1, further comprising:
   a recording layer; and
   a reflective layer.

3. The optical information recording medium of claim 1, wherein the recording layer comprises an organic dye.

4. The optical information recording medium according to claim 1, wherein the groove in the preformat area has approximately a V-shaped cross-section taken along the diameter direction of the recording medium.

5. The optical information recording medium of claim 1, wherein the optical information recording medium is suitable for recording with laser light at a wavelength of approximately 360-450 nm.

* * * * *